UNITED STATES PATENT OFFICE.

MORRIS E. CURTIS, OF EVERETT, MASSACHUSETTS.

PLASTIC COMPOSITION AND PROCESS OF MAKING THE SAME.

1,233,264.   Specification of Letters Patent.   Patented July 10, 1917.

No Drawing.   Application filed April 27, 1915.   Serial No. 24,335.

*To all whom it may concern:*

Be it known that I, MORRIS E. CURTIS, a citizen of the United States, residing at Everett, in the county of Middlesex and State of Massachusetts, have invented new and useful Improvements in Plastic Compositions and Processes of Making the Same, of which the following is a specification.

My invention consists in a new and improved composition of matter and in the process by which said composition of matter is produced.

The object of my invention is to produce a composition of matter which can be used in the manufacture of a large variety of articles of manufacture, such, for example, as boxes containing paste, for different articles to be used in manicuring sets, for the backs of brushes and for any articles of manufacture in which a light, hard material of neat appearance and coloring is desired, which will take a high polish and which is non-inflammable.

I have secured a composition of matter possessing these different characteristics by first combining white shellac, china clay and sulfur in the proportion of one ounce of white shellac, one and one-half ounces of china clay and one-half ounce of sulfur. These ingredients are powdered and thoroughly mixed together in a mortar while dry; the second step in the process of manufacturing consists in taking the three ingredients thus mixed, placing them in a suitable receptacle or pan and adding a small amount, about two fluid ounces, of water, the water being preferably distilled. Third, the contents of the pan are then heated over a Bunsen burner and cooked until said contents become a paste and finally assume a plastic form, the water and other ingredients being mixed together while in the pan and during the heating process set forth. Fourth, the contents of the pan is taken out and kneaded about three or four minutes until it begins to harden, when it is cut into lumps of suitable size, a convenient means for doing this being to force the plastic mass through a tube and cut it off in suitable lengths. Fifth, these cylindrical lumps or sections of the material are then put in an oven and subjected to heat of from 350 to 500° F. until they return to a plastic state and during this heating process the sulfur melts and amalgamates with the shellac and clay. Sixth, the material thus obtained is put in a mold and compressed, in which mold it readily cools and hardens and can be removed from the mold in the form of a hard and smooth material of the same form as the mold. The material thus obtained is readily removed from the mold and does not stick to said mold.

The proportions of ingredients hereinbefore set forth may be varied and the amount of pressure applied may be varied. For example, when it is desired to have a harder and more brittle material I mix the ingredients in the following proportions, namely, one ounce of shellac, one ounce of china clay and one ounce of sulfur, and subject them to greater pressure. Other suitable resinous material may be used in place of shellac without departing from the spirit of my invention.

In order to render the material very tough I employ asbestos fiber or cotton fiber. When asbestos fiber is used it is stirred with the different ingredients hereinbefore set forth while the same are being heated to form a paste or a plastic material, as set forth in the third step in the process hereinbefore described, and about one-eighth of an ounce of asbestos fiber is used to the proportions of ingredients hereinbefore set forth. When cotton fiber is used about one sixty-fourth of an ounce is employed and preferably dissolved in a suitable reagent, such as Schweitzer's reagent, or the cotton fiber can be put into a beater and beaten into a fine pulp, if desired. The use of the reagent very much shortens the process. The cotton fiber, when dissolved in the reagent as described, is stirred in with the other ingredients and with the water during the first heating operation or step No. 3 of the process hereinbefore described.

The object of the shellac in the composition of matter hereinbefore set forth is to make the compound mold properly, that is, to render it plastic before hardening and to prevent the compound from sticking to the mold and to make the completed article waterproof; the purpose of the china clay is to render the finished article hard, and the object of the sulfur is to more thoroughly amalgamate the other ingredients and hold them together and when heated to have a vulcanizing effect upon the entire compound.

I claim:

1. The herein described composition of matter comprising shellac, china clay, sulfur and water.

2. The herein described composition of matter comprising shellac, china clay, sulfur and water mixed in the proportion of one ounce of shellac, one and one-half ounces china clay, one-half ounce sulfur and two fluid ounces of water.

3. The herein described composition of matter consisting of shellac, china clay, sulfur, water and fibrous material.

4. The herein described composition of matter consisting of one ounce of shellac, one and one-half ounces china clay, one-half ounce sulfur, two fluid ounces of water and one-eighth of an ounce of asbestos fiber.

5. The process of manufacturing the composition of matter hereinbefore set forth which comprises 1st mixing while in a dry state shellac, china clay and sulfur; 2d, mixing the three ingredients hereinbefore set forth with water; 3d, heating said ingredients and water until the same assume a plastic form; 4th, kneading said plastic material until it begins to harden; 5th, subjecting said plastic material to a heat of from 350 to 500° F. until it returns to a plastic state; and 6th, placing the same in a receptacle to cool, compressing the same and allowing it to harden.

6. The process of manufacturing the composition of matter hereinbefore set forth which consists in 1st mixing while in a dry state shellac, china clay and sulfur; 2d, mixing the three ingredients hereinbefore set forth with water; 3d, heating said ingredients and water and mixing therewith while heated a suitable fibrous material until the same assumes a plastic form; 4th, kneading said plastic material until it begins to harden; 5th, subjecting said plastic material to a heat of from 350 to 500° F. until it returns to a plastic state; and 6th, placing the same in a suitable receptacle such as a mold, compressing the same and allowing it to cool and harden.

In testimony whereof I have hereunto set my hand in presence of two subscribing witnesses.

MORRIS E. CURTIS.

Witnesses:
CHARLES S. GOODING,
SYDNEY E. TAFT.